United States Patent [19]

Smith

[11] 4,154,425
[45] May 15, 1979

[54] THROTTLE VALVE FOR USE IN A GAS TURBINE ENGINE FUEL CONTROL SYSTEM

[75] Inventor: Trevor S. Smith, Sutton Coldfield, England

[73] Assignee: Lucas Aerospace Limited, Birmingham, United Kingdom

[21] Appl. No.: 658,533

[22] Filed: Feb. 17, 1976

Related U.S. Application Data

[63] Continuation of Ser. No. 487,783, Jul. 11, 1974, abandoned.

[30] Foreign Application Priority Data

Jul. 27, 1973 [GB] United Kingdom ............... 36009/73

[51] Int. Cl. ............................................. F16k 31/04
[52] U.S. Cl. .................... 251/133; 74/661; 74/665 A; 74/665 B; 251/248
[58] Field of Search ................ 74/394, 665 A, 665 C, 74/665 L, 665 Q, 665 P, 661, 665 B; 251/133, 134, 135, 249, 249.5, 248

[56] References Cited

U.S. PATENT DOCUMENTS

| | | | |
|---|---|---|---|
| 1,776,444 | 9/1930 | McBane et al. | 74/665 L |
| 2,059,151 | 10/1936 | Smith, Jr. | 251/133 |
| 2,978,536 | 4/1961 | Doran | 74/394 |
| 3,488,030 | 1/1970 | Hulme et al. | 251/134 |
| 3,548,671 | 12/1970 | Mueller | 74/394 |
| 3,608,391 | 9/1971 | Bargstedt et al. | 74/394 |
| 3,709,059 | 1/1973 | Elsel | 74/661 |
| 3,726,150 | 4/1973 | Ikeda | 74/394 |

FOREIGN PATENT DOCUMENTS 1044302 11/1953 France.
1258865 12/1971 United Kingdom.
1301660 1/1973 United Kingdom.

*Primary Examiner*—Martin P. Schwadron
*Assistant Examiner*—G. L. Wolton
*Attorney, Agent, or Firm*—Cushman, Darby & Cushman

[57] ABSTRACT

A throttle valve has a control member which is angularly positioned by two stepper motors which drive the control member through differential gearing. The drives to the control member are arranged so that a single step displacement of the respective motors in the same direction drives the control member by different amounts in opposite directions, providing a high resolution drive. The control member may be driven at a high speed by reversing one of the motors.

4 Claims, 1 Drawing Figure

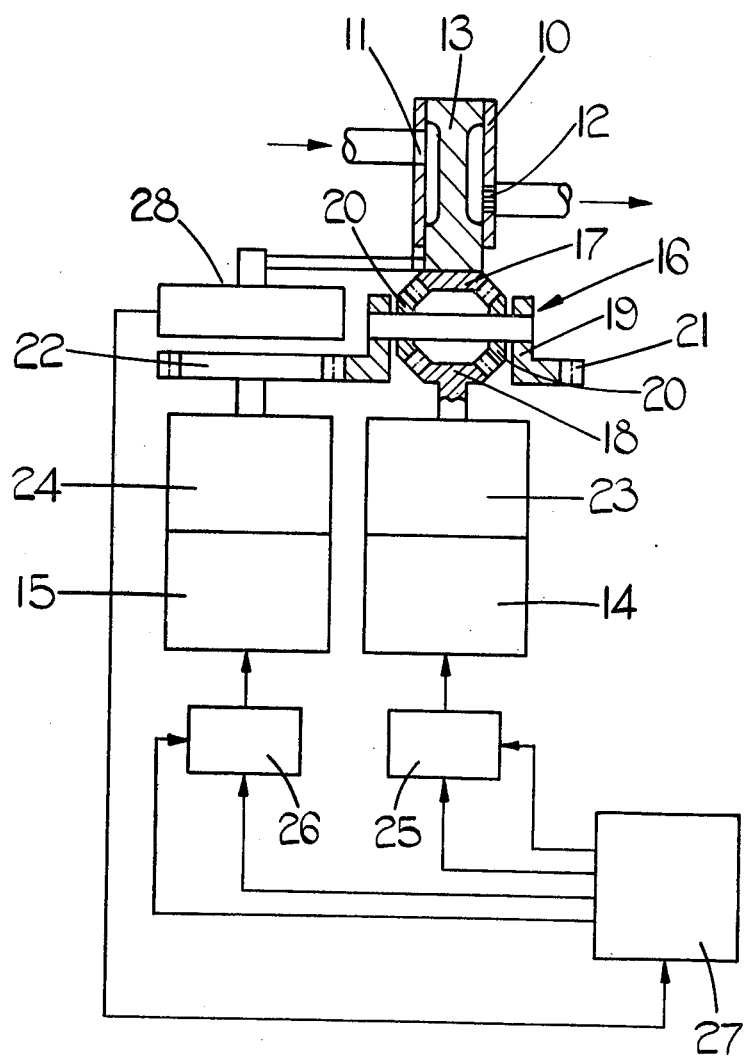

THROTTLE VALVE FOR USE IN A GAS TURBINE ENGINE FUEL CONTROL SYSTEM

This is a continuation, of application Ser. No. 487,783 filed July 11, 1974, now abandoned.

In gas turbine engine fuel control systems proposals have been made to utilise a digital computer as the main source of control signals to determine fuel flow to the engine. Interfacing a digital computer with a fuel system present some problems, however, in that it is difficult with conventional arrangements to obtain the necessary high degree of resolution.

If, for example, a stepping motor is used to drive a throttle valve, then the conflicting requirements of fast response and high resolution make selection of the gear ratio of the drive between the stepper motor and the valve extremely difficult. The frequency at which stepping motors can respond is limited so that to obtain a fast response a gear ratio would have to be used which would give an unacceptably high fuel flow increment for a single step of the motor.

It is accordingly an object of the invention to provide a throttle valve with an actuator suitable for interfacing with a digital control computer in which the problem outlined above is overcome.

A throttle valve in accordance with the invention comprises a ported body, a flow control member movable in the body so as to control the flow therethrough, a differential gear mechanism having an output member coupled to the flow control member and first and second input members drivingly coupled to the output member, and a pair of electrical stepper motors drivingly connected to the respective input members, the driving connections of said stepper motors to said output member being such that a single step displacement of one stepper motor effects a smaller angular displacement of the flow control member from the angular displacement thereof effected by a single step displacement of the other stepper motor.

With this arrangement fine resolution can be obtained by actuating the motors so that each motor produces an opposite flow control displacement. Furthermore a high speed of response can be obtained by actuating the motors at the maximum frequencies so that both the motors displace the control member in the same direction.

Moreover the arrangement defined above also provides an additional highly desirable feature, i.e. that of added safety, since it is unlikely that both motors or their drive circuits will fail simultaneously and in the event of a failure control, albeit a degraded control, can still be effected over the valve flow control member position without duplication of parts.

An example of the invention is shown diagrammatically in the accompanying drawing.

The throttle valve shown has a body 10 with an inlet port 11 and an outlet port 12 which is in the form of a pattern of drillings which are progressively covered or uncovered as a flow control member 13 rotatably mounted in the body 10 is rotated.

For rotating the flow control member 13 there is provided a pair of electrical stepper motors 14, 15 which are connected to the member 13 by a differential gear mechanism 16. This mechanism consists of an output bevel gear 17 on the member 13, a first input member in the form of an identical bevel gear 18 driven by the motor 14 and a second input member in the form of a carrier 19 which carries bevel gears 20 meshed with the gears 17 and 18. The carrier 19 has external teeth 21 meshed with a pinion 22 driven by the second stepper motor 15.

The arrangement of this differential gear mechanism is such that the velocity ratio of the drive from the gear 18 to the gear 17 is −1 whereas the velocity ratio of the drive from the carrier 19 to the gear 17 is 2. The motors 14, 15 drive the gear 18 and the pinion 22 through reduction gear boxes 23, 24 respectivly such that this 2:1 difference in the velocity ratios is partially but not totally compensated for, so that a single step displacement of one motor will cause a slightly larger rotation of the member 13 than a single step displacement of the other motor.

The motors 14, 15 have their own independent control circuits 25, 26 which, in conventional fashion have separate input terminals for determining the direction of rotation and the speed of rotation of the associated motor. Both of these control circuits are in turn controlled by the control computer 27 which receives an input signal (inter alia) from a position pick off transducer 28 driven by the member 13.

I claim:
1. An internal combustion engine throttle control apparatus for selectively controlling a throttle valve to provide both high resolution control and rapid response control thereof, said throttle control apparatus comprising:
   a ported body,
   a throttle flow control member movable in the body so as to control the flow therethrough,
   a pair of electrical stepper motors, and
   means interconnected with said internal combustion engine throttle flow control valve for causing a high resolution movement of said throttle flow control member when said motors rotate in a first relative direction with respect to one another and for causing a high speed movement of said throttle flow control member when said motors rotate in a second relative direction with respect to one another, said means including first and second driving connections between respective ones of said stepper motors and said throttle flow control member, said first and second driving connections including a single differential gear mechanism having an output member coupled to the throttle flow control member and first and second input members drivingly coupled to the output member, said stepper motors being drivingly connected to the respective input members, and the gear ratio of said first driving connections being different from that of said second driving connection wherein the movement of said throttle flow control member is dependent upon the gear ratio difference when said stepper motors rotate in a first relative direction and the movement of said throttle flow control member is dependent upon the gear ratio sum when one of said stepper motors rotates in a second relative direction and wherein said gear ratio sum or difference is never zero.

2. The throttle valve control of claim 1 wherein said differential gear mechanism provides first and second drive paths between respective ones of said input members and said output member, said first and second drive paths having first and second gear ratios, respectively.

3. The throttle valve control of claim 2 wherein said first and second driving connections further include first and second gear members which form respective driving connections between said stepper motors and said first and second input members, said first and second gear arrangements respectively having third and fourth gear ratios, wherein the product of the first and fourth gear ratios differs from the product of said second and third gear ratios.

4. The throttle control of claim 3 further comprising a transducer means responsive to the angular position of said flow control member for providing a feed-back signal to said stepper motors to control the operation thereof.

* * * * *